Figure 1:
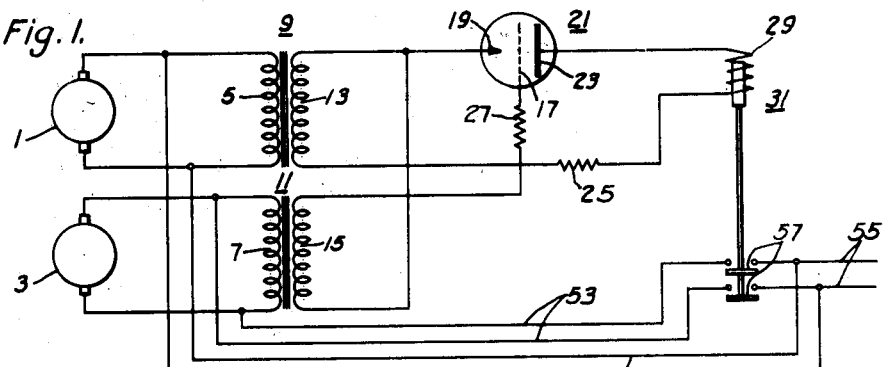

Oct. 22, 1935.  D. D. KNOWLES  2,018,268

MEANS FOR INDICATING SMALL PHASE DIFFERENCES OF INTERCONNECTED SYSTEMS

Filed Sept. 22, 1931

WITNESSES:

INVENTOR
Dewey D. Knowles
BY
ATTORNEY

Patented Oct. 22, 1935

2,018,268

UNITED STATES PATENT OFFICE 2,018,268

MEANS FOR INDICATING SMALL PHASE DIFFERENCES OF INTERCONNECTED SYSTEMS

Dewey D. Knowles, Wilkinsburg, Pa., assignor to Westinghouse Electric & Manufacturing Company, a corporation of Pennsylvania Application September 22, 1931, Serial No. 564,266

4 Claims. (Cl. 172—245)

My invention relates to indicating and controlling apparatus and has particular relation to apparatus utilized in indicating the frequency and phase relationship between generating systems and in controlling the condition of the generating systems in accordance with the frequency and phase relationship.

It is an object of my invention to provide a frequency meter.

Another object of my invention is to provide a frequency meter of a type that shall have no moving parts.

Still another object of my invention is to provide an instrument for indicating the phase relationship between a plurality of generating stations.

A still further object of my invention is to provide a phase-angle meter of a type that shall be highly sensitive and that shall have a minimum number of movable parts.

A still further object of my invention is to provide a system for interconnecting a plurality of generating stations when the generating stations attain predetermined characteristics.

More concisely stated, it is an object of my invention to provide for a power generating system, a simple, tractable and inexpensive device for indicating the phase, frequency and amplitude relationships between the electro-dynamic devices associated with the system and for controlling the activity of the electro-dynamic devices.

According to my invention, I provide an indicating and controlling system which includes an electric discharge device, preferably of the type incorporating a control electrode and a plurality of principal electrodes. The electric discharge device is preferably of the gas filled type and preferably of the cold electrode type, although I have found that in certain situations the electric discharge devices of other types such as thermionic devices, mercury discharge devices and hot cathode gas filled devices, may be utilized.

I have found my invention particularly applicable in the following forms:

1. As a frequency meter, that is to say, as an indicator of the differences in frequencies between a plurality of electro-dynamic machines.

2. As a synchroscope, that is to say, as a device for controlling the interconnection of a plurality of generating electro-dynamic machines, and an output line.

3. As a phase angle meter, that is to say, as an indicator of the phase differences between a plurality of electro-dynamic machines.

It is a well known fact that a gas filled electric discharge device has definite breakdown points for predetermined relative values of voltage impressed between the principal electrodes of the device and between the control electrode and one principal electrode of the device. This property of the electric discharge device can be utilized with advantage in frequency meters.

In the simplest form of the application of my invention to frequency meters, one of the electro-dynamic machines is coupled between the control electrode and a principal electrode of the electric discharge device preferably of the gas filled type, while another of the machines is coupled between the principal electrodes of the electric discharge device. When the voltage applied between the principal electrodes of the device attains a predetermined value relative to the voltage applied between the control electrode and one of the principal electrodes of the device a discharge takes place between the principal electrodes of the electric discharge device.

The discharge which takes place in a gas-filled device has an abrupt characteristic and emits a luminous glow. By observing the rate of intensity, fluctuations of the luminous discharge in the electric discharge device the frequency relationship between the electro-dynamic machines may be determined.

In a more complex, but for some situations, preferred, application of my invention to frequency meters, the constants of the circuit of the electric discharge device are so related that the peak values of the voltages impressed from the electro-dynamic machines must be simultaneously impressed between the electrodes for a discharge to take place in the electric discharge device.

In such a case, the electric discharge device will flash for a short time only after a coincidence of the peak values has taken place in the voltages impressed between the electrodes. The frequency difference between two electro-dynamic systems, can, therefore, be determined by counting and timing the number of flashes of the electric discharge device which take place when such a system is in operation.

It will be noted that in the present connection the gas-filled discharge device of the grid-glow type is particularly efficacious by reason of the luminous character of its discharge. The utility of the grid-glow tube in the system constructed according to my invention stands out particularly when it is remembered that by incorporating the device in the system a device responsive to the condition of a plurality of transmission lines and indicative of their condition is provided in a single compact container.

With very few modifications, a frequency meter may be transformed into a synchroscope. In the synchroscope, voltages from the electro-dynamic machines are impressed between the principal electrodes and between the control electrode and one principal electrode of the electric discharge device. The coupling between the electro-dynamic device and the electric discharge device is so adjusted that the electric discharge device becomes energized when the proper phase and frequency relationship is established between the electro-dynamic devices. In such a case, a relay, the coil of which is connected in the principal circuit of the electric discharge device, becomes energized and the necessary interconnection between the output line and the electro-dynamic devices takes place.

Thus, for example, it may be necessary to connect two generators in parallel to a line when these voltages attain a predetermined value, and when they have the same frequency and are in phase with each other. An electric discharge device and its appurtenant impedances are so selected that the device becomes energized only when the peak values of the voltage supplied by the generators are simultaneously impressed between its electrodes. When this condition is attained, the relay in the principal circuit of the device becomes energized and the electro-dynamic machines are connected in parallel.

The phase angle meter is, in many respects, similar to the frequency meter. Voltages from the electro-dynamic stations under observation are coupled between the electrodes of the electric discharge device and a plurality of indicating instruments located at the stations, and possibly at a central station, are connected in the principal circuit of the electric discharge device. The current transmitted in the principal circuit of the electric discharge device gives an indication of the phase relationship between the stations. In this case, the relative voltages required for the excitation of the electric discharge device are considerably below the peak value voltages of the electro-dynamic devices.

I have found in connection with the phase angle meter, that a frequency changer may, with advantage, be associated with each electro-dynamic station. The frequency changer may be a small motor generator set or an oscillating circuit properly excited from the electro-dynamic machine. It should preferably increase the frequency several times.

By thus increasing the frequency, the phase difference between the electro-dynamic machines is amplified and may more readily be indicated on the meters. Thus, if the frequency changer increases, the frequency of the electro-dynamic machines by a ratio of 10 to 1, one degree phase difference of the electro-dynamic stations is indicated as 10 degrees phase difference in the phase angle measurement equipment.

In one installation of my improved phase angle meter, I have found that a difference of 1 degree in phase corresponds to a difference of 1% in the current transmitted between the principal electrodes of the electric discharge device. It is seen that the 1% may be increased to several percent by the addition of the frequency changers.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawing, in which, Figure 1 is a diagrammatic view showing a circuit whereby my invention is applied as both a frequency meter and as a synchroscope.

Figure 2:
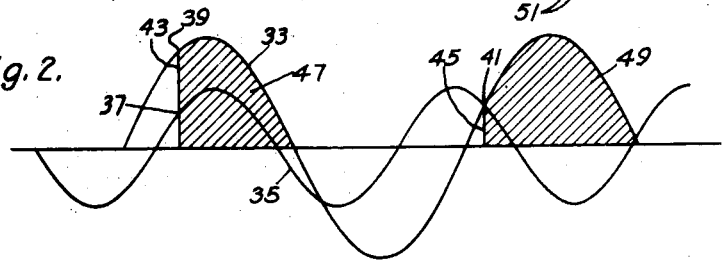
Figure 3:
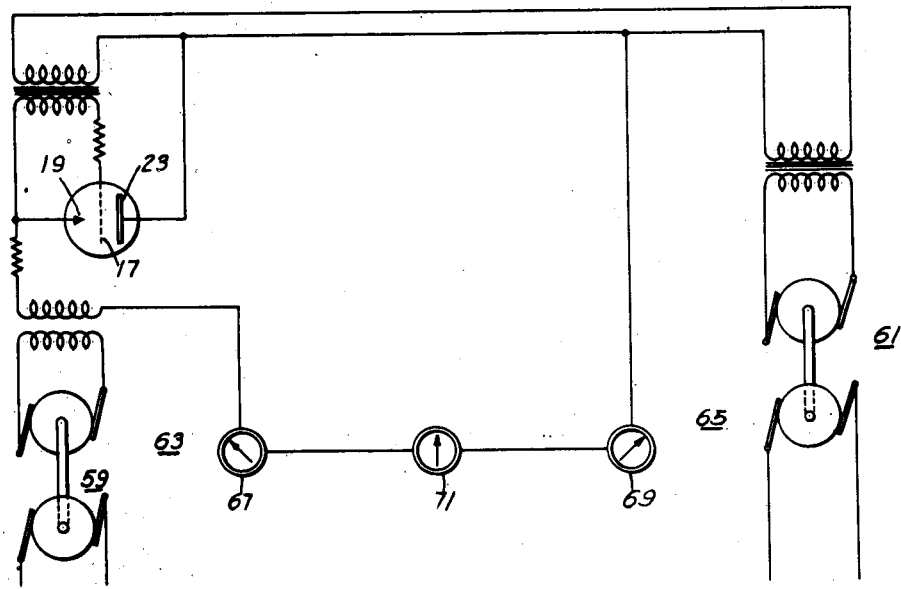

Fig. 2 is a graph showing the relationship between the voltages impressed between the electrodes of the electric discharge device of the type utilized in the practice of my invention and the resulting current between the principal electrodes of the electric discharge device, and Fig. 3 is a diagram showing the circuit utilized when my invention is applied to the indication of phase angle differences.

The apparatus shown in Fig. 1 comprises a plurality of alternating current generating machines 1 and 3 which may be regarded as symbolical of electro-dynamic machines of any type. The machines feed into the primaries 5 and 7 of a plurality of transformers 9 and 11, the secondaries 13 and 15 of which are respectively connected between the control electrode 17 and the anode 19 of an electric discharge device 21, and between the cathode 23 and the anode 19 of the electric discharge device 21 through the requisite impedances 25 and 27 and through the coil 29 of a relay 31.

As illustrated in the drawing, the electric discharge device 21 is of the cold electrode type. It is, moreover, of the gas filled type. Such a type of tube is disclosed, for example, in my co-pending application Serial No. 149,290, filed November 19, 1926. The response of such a device is shown in Fig. 2.

The sinusoidal curve 33 having the greater amplitude represents the voltage impressed between the principal electrodes 19 and 23 of the device 21 and the sinusoidal curve 35 having the smaller amplitude represents the voltage impressed between the control electrode 17 and one principal electrode 19 of the electric discharge device 21. For predetermined relative values of these two voltages, as indicated by the intersection 37, 39 and 41 of the curves 33 and 35 with lines 43 and 45 of Fig. 2, the device becomes energized. The values are predetermined by the impedances 9, 11, 25, 27 and 29 of the circuit and by the character of the electric discharge device 21.

As shown in the drawing, the electric discharge device becomes energized for a predetermined positive value of the voltages impressed in the control circuit and a corresponding value of the voltage impressed in the principal circuit. It is to be noted, that while there are devices of the type wherein excitation occurs when the voltage impressed in the control circuit may be of negative polarity relative to the voltage impressed in the principal circuit, I have preferred to utilize a device of the type wherein both voltages must be of the same polarity for excitation. Moreover, since the device that I have preferred to utilize has asymmetrical properties, the voltage necessary for excitation must be positive for both circuits.

The shaded areas 47 and 49 under the curve 33, shown in Fig. 2, represent the periods during which a considerable current passes between the principal electrodes 19 and 23 of the electric discharge device 21. It will be noted, that the control electrode 17 regulates the current of the electric discharge device of the type preferably utilized in the practice of my invention only while it is in an inactive state. As soon as the electric discharge device is energized, it passes current regardless of the electrostatic condition of the control electrode so long as the proper polarity is maintained between its principal electrodes.

From the operation of the electric discharge device, the action of the system shown in Fig. 1 is readily apparent. When the system is utilized as a frequency meter the constants of the circuit associated with the electric discharge device 21 are properly adjusted. The electric discharge device 21 becomes energized when the voltage impressed from one generator 1 has a predetermined value and a predetermined polarity relative to the voltage impressed from the other generator 3. This phenomenon will take place at a periodicity dependent on the relative values of the frequency and the amplitude of the voltages impressed between the electrodes of the electric discharge device 21.

When the voltages are so adjusted that peak values must coincide for breakdown, a flash persisting for a ¼ period takes place between the electrodes 19 and 23 of the electric discharge device 21 when the peak voltages come into coincidence. By counting and tuning these flashes, the frequency difference between the two generating systems can be determined.

When the system is utilized as a synchroscope a plurality of bus lines 51 and 53 are connected across each of the generators 1 and 3. One of these bus lines 51 may be connected directly to the output line 55 while the other bus line 53 is connected to the output line through the contactors 57 of the relay 31. If, in the present case, the constants of the circuits such as 9, 11, 25, 27 and 29 are properly adjusted, the electric discharge device 21 becomes energized when the phase, frequency and amplitude relationship between the generating systems attain the proper condition. The relay 31, therefore, becomes energized and the generators are connected in parallel to the output line under the proper conditions.

It will be apparent that in its present application my invention may be applied to connect in a second generating system when the load becomes too great for the generating system that is supplying the power. It will be noted that unless the amplitude, frequency and phase relationship of the two generators are equal, one generator will feed into the other and an extremely unsteady and unstable start will be produced. By utilizing my improved synchroscope such a condition is eliminated in a simple and inexpensive manner.

In Fig. 3, my invention is shown as applied to phase angle measurement. In this system a plurality of frequency changers 59 and 61 are located at each station 63 and 65 and are coupled to the electro-dynamic machines under observation. The frequency changers 59 and 61 may be comparatively small motor generators (as shown) or they may be converting systems incorporating electric discharge devices of the type shown, for example, in Patent No. 1,347,894 to L. W. Chubb, or of the type shown in Patents Nos. 1,275,967 to F. W. Meyer or 1,280,769 to Langmuir.

Unless the phase difference between the two stations 63 and 65 is comparatively large, the frequency changers 59 and 61 are of such a character as to multiply the frequency.

The frequency changers are coupled, respectively, between the control electrode 17 and the anode 19 of an electric discharge device 21 and between the cathode 23 and the anode 19 of an electric discharge device. A plurality of meters 67, 69 and 71, one disposed at each station 63 and 65 and one disposed at a central station are connected in the principal circuit of the electric discharge device 21 and respond to the current transmitted between the principal electrodes 19 and 23 of the electric discharge device, thus giving an indication of the phase difference between the two generating stations.

My invention has been shown herein as specifically applying to, and to be utilized with an electroionic device of a specific type and with a specific arrangement of elements. It is apparent that other electric discharge devices may be utilized in the practice of my invention and that the elements of the device may be arranged in systems other than are shown in the drawing and are described in the specification.

To be specific, my invention may be applied, for example, with electric discharge devices of the types shown in Patent No. 1,364,129 to F. W. Meyer. In such a case, it is apparent that more than two generating stations or more than two electro-dynamic machines may be controlled or observed by a system constructed in accordance with my invention. Moreover, electric discharge devices of the type shown in Patent No. 1,369,457 to F. W. Meyer may be utilized, and where convenient, moderate pressure devices of the type shown in Patent 1,230,004 to G. S. Meikle properly modified may be utilized.

If a device of the type shown in Patent No. 1,364,129 is utilized, the frequency difference between a plurality of electro-dynamic machines may be observed by connecting the machines to the electrodes of a device such as 37 of Fig. 1 of the patent. The frequency relation between the machines and a standard machine also connected between the electrodes of the electric discharge device may be observed by counting the flashes and noting the arms in which the flashes take place.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Indicating apparatus for a plurality of generating stations which comprises a gas filled electric discharge device of the type including a control electrode and a plurality of principal electrodes, means for coupling certain of said stations to said control electrode and one of said principal electrodes, means for coupling certain other of said stations to said principal electrodes and frequency changers at said stations, said gas adapted to glow at the coincidence of the peak values of the voltages in the last two mentioned means.

2. Indicating apparatus for a plurality of generating stations comprising a gas filled electric discharge device of the type including a control electrode and a plurality of cold principal electrodes, means for coupling certain of said stations to said control electrode and one of said principal electrodes, means for coupling certain other of said stations to said principal electrodes and frequency changers at said stations, said gas adapted to glow at the coincidence of the peak values of the voltages in the last two mentioned means.

3. Indicating apparatus for a plurality of electro-dynamic machines comprising an electroionic device, a principal circuit and an auxiliary circuit associated with said device, a frequency changer associated with said electro-dynamic machines, output circuits associated with each of said frequency changers, means for coupling said auxiliary circuit to certain of said output circuits and said principal circuit to another of said output circuits and means for indicating the current in said principal circuit.

4. An indicating system for a plurality of electro-dynamic devices, an electric discharge device and means for indicating the electrical condition of said electric discharge device, in combination with means for changing the frequencies of said electro-dynamic devices, said means being operatively associated with said electric discharge device.

DEWEY D. KNOWLES.